United States Patent
Rantapuska et al.

(10) Patent No.: US 9,807,176 B2
(45) Date of Patent: Oct. 31, 2017

(54) METHOD AND APPARATUS FOR CONNECTION MANAGEMENT

(71) Applicant: Nokia Technologies Oy, Espoo (FI)

(72) Inventors: Olli Rantapuska, Vantaa (FI); Oskari Koskimies, Helsinki (FI); Raimo Vuonnala, Helsinki (FI)

(73) Assignee: Nokia Technologies Oy, Espoo (FI)

(*) Notice: Subject to any disclaimer, the term of this patent is extended or adjusted under 35 U.S.C. 154(b) by 102 days.

(21) Appl. No.: 14/649,554

(22) PCT Filed: Dec. 12, 2012

(86) PCT No.: PCT/FI2012/051231
§ 371 (c)(1),
(2) Date: Jun. 4, 2015

(87) PCT Pub. No.: WO2014/091058
PCT Pub. Date: Jun. 19, 2014

(65) Prior Publication Data
US 2016/0028831 A1  Jan. 28, 2016

(51) Int. Cl.
*G06F 15/16* (2006.01)
*H04L 29/08* (2006.01)
(Continued)

(52) U.S. Cl.
CPC ........... *H04L 67/141* (2013.01); *G06F 21/50* (2013.01); *H04L 41/12* (2013.01);
(Continued)

(58) Field of Classification Search
CPC ............... H04L 29/06; H04L 29/08072; H04L 29/08576
(Continued)

(56) References Cited

U.S. PATENT DOCUMENTS

| | | | |
|---|---|---|---|
| 2005/0010688 A1* | 1/2005 | Murakami | G06F 13/4081 709/245 |
| 2011/0153718 A1 | 6/2011 | Dham et al. | |
| 2012/0036179 A1* | 2/2012 | Hegde | H04L 61/1511 709/203 |

FOREIGN PATENT DOCUMENTS

WO  WO 2007074359 A1  7/2007

OTHER PUBLICATIONS

Berger, S. et al: "Web Services on Mobile Devices—Implementation and Experience", Workshop on Mobile Computing Systems & Applications, 2003.
(Continued)

*Primary Examiner* — Alan S Chou
(74) *Attorney, Agent, or Firm* — Seppo Laine Oy

(57) ABSTRACT

In accordance with an example embodiment of the present invention, there is provided a method, comprising receiving in an apparatus a first message from a second apparatus located in a different domain as the apparatus, the first message comprising a logical name of the second apparatus and a first global address, receiving a second message from a third apparatus, the second message comprising a second global address, and determining whether the first and second global addresses are the same address, or where the first and second global addresses are IPv6 addresses, whether they belong to the same network, and responsive to the first and second global addresses being the same address, or in the case of IPv6 belonging to the same network, causing transmission of information comprising at least one of a logical name and a local address of the second apparatus to the third apparatus.

13 Claims, 7 Drawing Sheets

(51) Int. Cl.
  *G06F 21/50*   (2013.01)
  *H04W 8/00*   (2009.01)
  *H04L 12/24*   (2006.01)
  *H04L 29/12*   (2006.01)
  *H04L 29/06*   (2006.01)

(52) U.S. Cl.
  CPC ...... *H04L 61/1541* (2013.01); *H04L 61/2585* (2013.01); *H04L 61/6059* (2013.01); *H04L 67/16* (2013.01); *H04W 8/005* (2013.01); *H04L 61/1511* (2013.01); *H04L 61/2076* (2013.01); *H04L 61/2514* (2013.01); *H04L 63/02* (2013.01)

(58) Field of Classification Search
  USPC ....................................................... 709/228
  See application file for complete search history.

(56) References Cited

OTHER PUBLICATIONS

Brian, M. et al: "How Domain Name Servers Work", Jul. 27, 2012.
Mockapetris, P.: "Domain Names—Implementation and Specification", Nov. 1987.
Smith, C. et al: "Considerations for the use of the Host Name Option", Mar. 2003.

\* cited by examiner

METHOD AND APPARATUS FOR CONNECTION MANAGEMENT

TECHNICAL FIELD

The present application relates generally to managing connectivity and/or discovering devices in a local network.

BACKGROUND

Communication-enabled devices such as laptops, mobile terminals and personal computers can be connected to further devices and each other via wired or wireless connections. A local-area network, LAN, may function based on the Ethernet standard, for example, to connect a group of personal computers into a local network. A local network may comprise devices that are addressable to each other using addresses that are routable, or valid, in the context of the local network. In other words, a message released into a local network comprising as a to-address a local address of a first device will be routed internally in the local network to the first device. A message comprising the same local address as to-address released into a network outside the local network will not be successfully routed to the first device since the local address is not valid outside the local network.

A local network may be connected to an external network, such as the internet, through a gateway disposed between the local network and the external network. Being disposed between the networks may comprise that the gateway has an interface to the local network and that the gateway has an interface to the external network. These interfaces may be referred to as a local interface and global interface, respectively.

The gateway may be configured to handle addressing between the networks so that a device sending a message to a node in the external network may release the message into the local network with a local address of the local interface of the gateway in a to-address field of the message, and upon receipt of the message the gateway may replace its own local address with an address of the node in the external network in the to-address field of the message. In the other direction, the node in the external network may reply to the device in the local network by releasing into the external network a message with an address of the global interface of the gateway in the to-field, and responsive to receiving this message, the gateway may insert the local address of the device in the local network into the to-field, and release the message into the local network via the local interface of the gateway. This kind of address handling may be referred to as network address translation, NAT.

When devices in the local network seek to communicate with each other, they can use local addressing to address each other without a need for address translation. Devices in a same local network may be associated with each other, for example where the local network is a corporate LAN or where the local network is a wireless local area network, WLAN. Devices in a WLAN may be associated with each other by being in physical proximity to each other.

Before devices in the same local network can communicate with each other, they need to become aware of each other. A process of becoming aware may be called a discovery procedure, whereby devices discover each other on a local network. A simple discovery procedure comprises that a user of a first device manually enters a local address of a second device into his device. Other discovery procedures comprise broadcasting in the local network to search for other devices.

SUMMARY

Various aspects of examples of the invention are set out in the claims.

According to a first aspect of the present invention, there is provided an apparatus, comprising a receiver configured to receive a first message from a node, the first message comprising a local address assigned to the apparatus, a transmitter configured to cause a second message to be transmitted toward a server, the second message comprising a logical name of the apparatus, and at least one processing core configured to process a connection request message received from a second apparatus via the receiver.

According to a second aspect of the present invention, there is provided an apparatus, comprising a receiver configured to receive from a server information comprising at least one of a logical name and a local address of a second apparatus at least one processing core configured to execute the at least one active content element, wherein each active content element is configured to, when executed, cause a probe message to be transmitted to the second apparatus, and a transmitter configured to, responsive to receipt of a response to the probe message, cause a connection request message to be transmitted to the second apparatus.

According to a third aspect of the present invention, there is provided an apparatus, comprising a receiver configured to receive a first message from a second apparatus located in a different domain as the apparatus, the first message comprising a logical name of the second apparatus and a first global address the receiver being further configured to receive a second message from a third apparatus, the second message comprising a second global address, and at least one processing core configured to determine whether the first and second global addresses are the same address, or where the first and second global addresses are IPv6 addresses, whether they belong to the same network, and responsive to the first and second global addresses being the same address, or in the case of IPv6 belonging to the same network, cause transmission of information comprising at least one of a logical name and a local address of the second apparatus to the third apparatus.

According to further aspects of the present invention, there are provided methods for operating apparatuses according to the foregoing aspects, and computer programs configured to cause such methods to be performed, when run.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 7 of the drawings.

Figure 1:
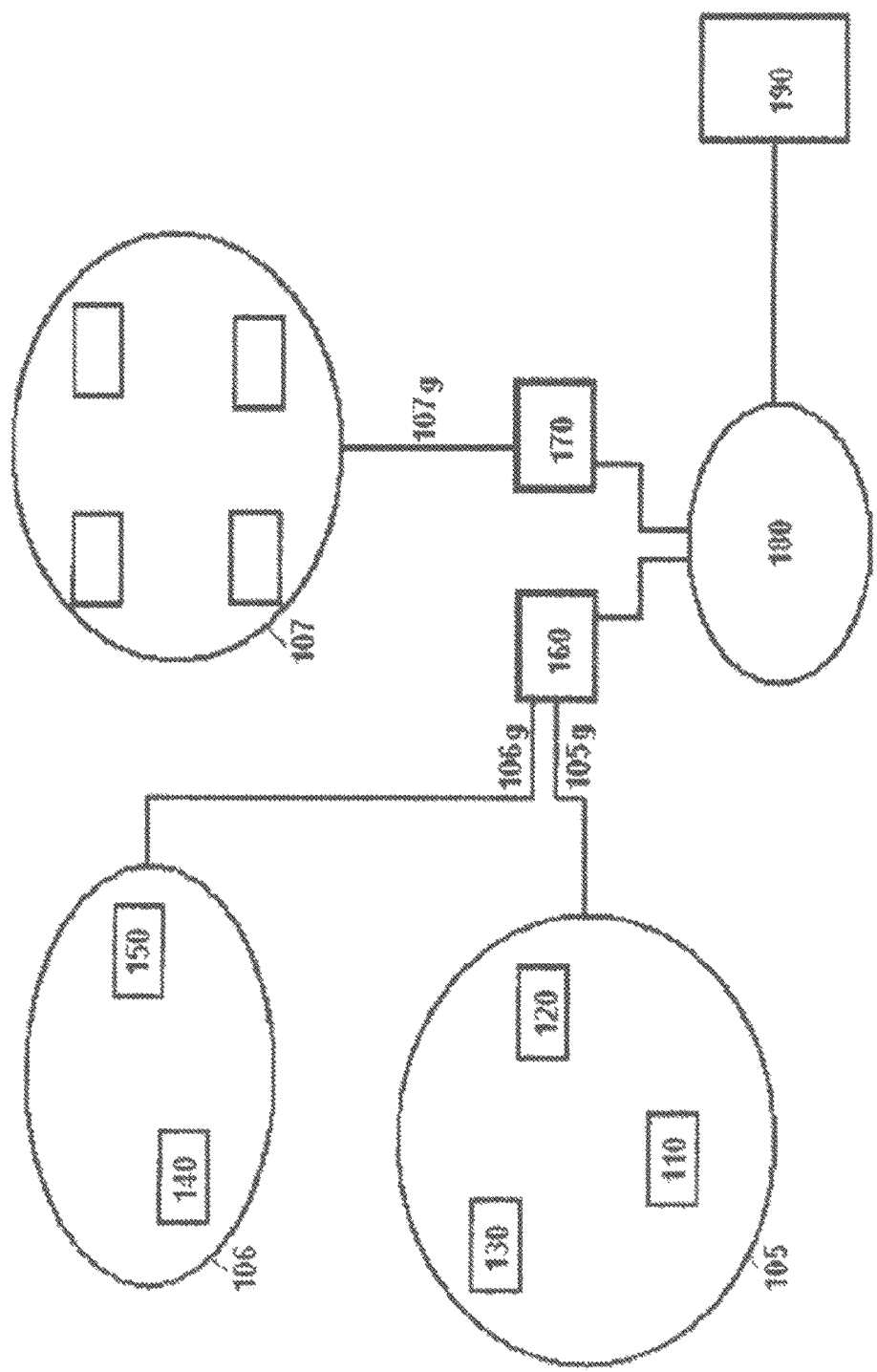
FIG. 1 illustrates an example system capable of supporting at least some embodiments of the invention.

FIG. 1 illustrates an example system capable of supporting at least some embodiments of the invention. Illustrated are devices 110, 120 and 130 comprised in local network 105. Similarly are illustrated devices 140 and 150 comprised in local network 106, and four unlabeled devices comprised in local network 107. Device 110 may comprise a desktop or laptop computer, tablet computer, smartphone, mobile phone, user terminal or other connected device. Devices 120 and/or 130 may also comprise desktop or laptop computers, tablet computers, smartphones, mobile phones, user terminals or other connected devices. Local network 105 may comprise a LAN or WLAN local network, for example. In some embodiments local network 105 comprises a closed subscriber group, CSG, cellular cell, or another kind of cellular subnetwork. Devices 110, 120 and 130 and networked connections interconnecting them together form local network 105. Messages can be exchanged between devices 110, 120 and 130 in local network 105 using local addressing, wherein local addresses of local network 105 are defined only in local network 105. Local network 105 is operably connected to external network 180 via gateway 160. Gateway 160 comprises an interface to local network 105 and an interface to external network 180. Connection 105g connects the local network 105 to gateway 160.

Local network 106 of FIG. 1 comprises devices 140 and 150. Local network 106 is, like local network 105, operably connected to external network 180 via gateway 160. Connection 106g connects local network 106 to gateway 160. Local network 106 has local addressing that is independent of local addressing in local network 105, in other words a local address of device 140 comprised in local network 106, for example, is not valid in local network 105. If a message is released in local network 105 with the local address of device 140 in a to-field, it will not be successfully routed since the local address of device 140 is not defined in local network 105. In some cases, by chance the local address of device 140 may be allocated to a device in local network 105, in which case the message may be routed to this device, not device 140.

Illustrated is also local network 107 comprising four devices. Local network 107 is operably connected to external network 180 via gateway 170. Connection 107g connects local network 107 to gateway 170. At least one of connections 105g, 106g and 107g may be at least partly wireless.

The local addressing systems of local networks 105, 106 and 107 may be based on internet protocol version 4, IPv4, or version 6, IPv6, for example. External network 180 has its own addressing system which may also be based on IPv4 or IPv6, for example. Addresses defined in external network 180 are valid in external network 180, not local networks 105, 106 or 107.

A user of device 110 in local network 105 may want to discover other devices in local network 105, for example for interaction to provide or obtain a service, such as file sharing. Device 120 may be configured to be ready to offer file-sharing or other services to other devices in local network 105, or in general to devices in a same local network as device 120. Device 120 may obtain for itself a local address valid in local network 105, and register the local address together with a logical name of device 120 in a name server such as, for example, a dynamic Doman Name System, dDNS, server. The local address may be obtained from gateway 160, for example. Subsequently to the registering, the name server may be queried for the local address of device 120, using the logical name of device 120. The name server will responsive to such a query provide the local address of device 120. A logical name may comprise at least one of a DNS address and a fully qualified domain name, FQDN.

Device 120 may further be configured to register itself in server 190 by transmitting a registration message to server 190 via gateway 160. The registration message may comprise the logical name of device 120 and, optionally, the local address of device 120. Gateway 160 may perform address translation on the registration message such that when server 190 receives the registration message, a from-address field may contain an address of gateway 160, according to addressing of external network 180. Server 190 may be configured to store at least part of the contents of the registration message, such as for example the address in the from-address field. The address in the from-address field may be considered to be the external address of device 120. Server 190 may receive a registration message from device 140 as well, which server 190 may also, at least in part, store. Server 190 may receive registration messages from devices comprised in local network 107. Registration messages of devices in local network 107 may, when received in server 190, comprise an address of gateway 170 according to addressing of external network 180 since local network 107 is connected to external network 180 via gateway 170, not gateway 160.

Optionally, device 120 may obtain its external address, by which it is meant the address of gateway 160 according to addressing of external network 180, by querying from an address service in external network 180. In this case device 120 can include this obtained address in a payload section of the registration message for use in server 190. An example of an address service capable of providing the external address is "whatismyip.com". Where the address is in the payload section, server 190 needn't rely on the from-address field to obtain the external address of device 120 but can obtain it from the payload section of the message. In this case, the address can be reliably obtained even in case the address translation in gateway 160 is performed in a non-standard way. In general server 190 may be considered to be configured to obtain an external address of device 120 from the registration message, such as for example from the from-address field, another header field, or the payload section.

Device 110 seeking to discover devices in local network 105 may transmit a request to server 190. Server 190 may be configured to responsively transmit information to device 110, for example in the form of a web page but other information formats are also possible. To determine the information to responsively transmit to device 110, server 190 may be configured to check the from-field of the request received from device 110, or in general to check an external address of device 110 that server 190 is configured to obtain from the request. Since the request will have traversed gateway 160 and undergone address translation, the from-field may comprise the address of gateway 160 according to addressing of external network 180. Alternatively, device 110 may include its external address in another part of the request message, as discussed above in connection with the registration message transmitted by device 120. Server 190 may guess that since the request comprises the same external address as the registration messages from devices 120 and 140, devices 110, 120 and 140 may be in the same local network. Server 190 can separate any registrations received from local network 107 from this group since those registrations were done based on registration messages comprising a different external address, namely the address of gateway 170 according to addressing of external network 180. In case the addresses involved are IPv6 addresses, server 190 may be configured to check, instead of checking whether the addresses are the same, whether the external IPv6 addresses of devices 110, 120 and/or 140 are in the same network, such as for example a same subnetwork or a same local network.

Responsively, server 190 may include in the information transmitted to device 110 information concerning devices 120 and 140, or in general information on all devices the registration messages of which appear to server 190 to come from the same externally routable address, or the registration messages of which comprise the same externally routable address. In the case of IPv6, server 190 may include in the information transmitted to device 110 information concerning all devices the registration messages of which comprise IPv6 addresses of the devices in the same network. In other words, server 190 selects information based on associating devices in at least one local network together based on externally valid addresses comprised in messages received from the devices. In detail, where messages from two devices comprise the same externally valid address, for example in the from-field, server 190 may associate the devices together as potentially in the same local network. The information may comprise logical names of devices 120 and 140 and, optionally, local addresses of devices 120 and 140.

Device 110 receives the information transmitted from server 190, wherein the information may comprise at least one active content element, for example where the information comprises information concerning two devices, the information may comprise two active content elements. In general, the information may comprise one active content element for each device concerning which the information comprises information. The active content elements are configured to be executed in device 110 and cause probing of the corresponding devices. The active content elements may comprise, for example, hidden subframes, also known as iframes, or other tags that allow cross-domain content loading.

The active content element comprised in information concerning device 120 may cause device 110 to query a name server for a local address of device 120, and responsive to receipt of a local address of device 120 from the name server, transmit a probe message to device 120. Device 120 may be configured to acknowledge the probe message, whereupon device 110 may consider device 120 as a confirmed device in local network 105. If the information received in device 110 comprises a local address of device 120, device 110 may be caused to initially attempt probing using the local address of device 120 received from server 190, and responsive to that failing, for example due to device 120 changing local address after registration, device 110 may be caused to query the name server and re-try the probing with a local address of device 120 received from the name server in case the name server and server 190 provide different local addresses of device 120. Where probing succeeds using a local address of device 120, device 110 may initiate a connection to device 120 by using a logical name of device 120, or by using the local address of device 120. Using a logical name may provide an advantage in that TLS certificates will function without an error message being provided for a user. The connection may be successfully established if the user acknowledges the error message, but using the logical name instead of local address may avoid the error message altogether.

Responsive to receiving a probe message, device 120 may be configured to adjust firewall settings of a firewall comprised in device 120 to allow connection attempts from the device that sent the probe message. For example firewall settings may be adjusted so that messages arriving from a local address comprised in a from-address field of the received probe message are admitted to device 120. Other messages may be blocked, unless allowed by separate rules.

The active content element comprised in information concerning device 140 may cause device 110 to query a name server for a local address of device 140. Since device 140 isn't in local network 105, the query may fail. In case the query succeeds, the active content element will cause device 110 to transmit a probe message to device 140 using addressing of local network 105. Since device 140 is in a different local network, the probe message will fail to reach its destination, and device 110 will realize the probing fails due to lack of an acknowledgement from device 140. In this case, device 110 would only consider device 120 as being in local network 105. Device 110 may then initiate a connection to device 120 to obtain or provide a service using local addressing of local network 105. In case device 110 receives a local address of device 140 directly from server 190, any probing using this address fails since this address isn't defined in local network 105, only local network 106.

Alternatively to an active content element, server 190 may be configured to provide a logical name and/or a local address of devices 120 and 140 to device 110 without using an active content element. Device 110 may be configured, in these embodiments, to perform the probing based on the logical name and/or local address. An advantage of using an active content element may be that the device discovery within a local network may be accomplished with a web browser of device 110 providing a seamless user experience in web surfing.

Optionally, in connection with registering with server 190, a notification channel may be established between device 120 and server 190, or in general between a registering device and server 190. The notification channel may comprise an address translation state maintained in a gateway to facilitate conveying messages transmitted from server 190 to a registered device, wherein server 190 may use the notification channel to inform registered devices that a further device has requested information and server 190 is about to, or recently has, responsively provided information comprising information concerning the registered device. The notification channel may also comprise a state maintained in device 120 allowing device 120 to receive notifications via the notification channel. In some embodiments, device 120 is configured to, responsive to receipt of a notification, adjust firewall settings of device 120 to allow probe messages to be received. Server 190 may be configured to notify via notification channels each device concerning which it transmits information to a requesting device.

Responsive to receiving such a notification, a registered device such as device 120 or 140 may start up an on-device server in anticipation of a connection attempt by the requesting device. This provides the utility that such an on-device server needn't be kept in an operative state all the time. In case the registered device doesn't receive a connection attempt within a predefined time period, it may turn off the on-device server. This is possible where, for example, the requesting device is in a different local network than the device in question, such as device 110 with respect to device 140 in the example discussed above.

The notification channel together with selectively adjusting firewall settings responsive to a probe message may provide improved security, since the server is started responsive to the notification message and a firewall configured to only allow wanted traffic. Security can be enhanced further by using transport layer security, TLS, in communication between devices in a local network. To facilitate this, the devices may possess a server certificate with a signature chain extending to a trusted root certificate authority, such as Verisign. Alternatively, self-signed certificates may be used. Using the root certificate alternative can be accomplished by assigning a separate sub-domain to each user, such as "alice.myphone.com", or even each device such as "alice1.myphone.com", and registering the devices's local address in a dDNS under that sub-domain. A certificate signed by a trusted authority then needs to be obtained to allow a secure hypertext transfer protocol, HTTPS, connection to the domain. An appropriate sub-domain certificate can be issued to each device and signed directly by a root authority, and server 190 may be configured to issue and sign individual sub-domain certificates, or a "wildcard" certificate common to all subdomains can be possessed by server 190 and all certificate checks received by a device may be forwarded to server 190.

In general there is provided a first apparatus, such as for example device 120 or a control apparatus for inclusion in device 120, to control the functioning thereof. The first apparatus may comprise a receiver configured to receive a first message from a node, such as for example a network address translation entity, the first message comprising a local address assigned to the first apparatus. Where the first apparatus comprises device 120, the receiver may comprise a wireless or wired receiver enabled to receive signals from outside device 120. Where the first apparatus is a control apparatus such as a chipset or processor, the receiver may comprise an input pin and port comprised in the control apparatus, enabled to receive information internally in device 120 when the control apparatus is installed in device 120. The first apparatus may comprise a transmitter configured to cause a second message to be transmitted toward a server, the second message comprising a logical name of the apparatus. The second message may comprise a registration request, for example. Where the first apparatus is a control apparatus, the transmitter may comprise an output pin and port comprised in the control apparatus, enabled to cause a transmitter of device 120 to transmit messages toward the server by signaling from the pin to the transmitter of device 120 internally in device 120. The first apparatus may further comprise at least one processing core configured to process a connection request message from a second apparatus, the connection request message being received in the first apparatus via the receiver comprised in the first apparatus. Transmitting the second message toward the server may comprise transmitting the second message via a gateway or http proxy, by releasing the second message into a local network with a to-address field set to a local address of said gateway or http proxy. The connection request may specify a type of connection that is requested. The connection request may specify a service that is requested or to be requested over the connection.

In some embodiments, the server is located in another domain than where the local address is routable. For example, the local address may be routable in a local network and the server may be disposed in another local network, or an external or globally routable network. Messages exchanged between the first apparatus and the server may traverse more than one address translating entity.

In some embodiments, the at least one processing core is configured to cause the first apparatus to participate in establishing a notification channel with the server, the receiver is further configured to receive a notification from the server via the notification channel and the at least one processing core is configured to, responsive to receipt of the notification, activate a local server of the first apparatus. In some embodiments a default state of the server is inactive, the server being activated responsive to notifications in anticipation of connection requests from devices in the same local network as the first device.

In some embodiments, the receiver is configured to receive a probe message from the second apparatus before receiving the connection request. In these embodiments, the transmitter is further configured to cause a response to the probe message to be transmitted toward the second apparatus. The probe message may be transmitted and relayed entirely within the local network, using local addressing of the local network. The connection request message may be transmitted and relayed entirely within the local network, using local addressing of the local network.

In some embodiments, responsive to receipt of a probe message the at least one processing core is configured to configure firewall settings of the first apparatus to allow traffic from the second apparatus. In some embodiments, the settings are configured to allow only traffic from the second apparatus. In some embodiments, the settings are configured to allow traffic from the second apparatus in addition to traffic that was allowed before receipt of the probe message. Prior to receipt of the probe message, the firewall settings may be configured to allow probe messages by describing at least one characteristic of probe messages.

In some embodiments, the transmitter is further configured to cause a registration request to be transmitted to a name server, such as for example a dDNS server, the registration request comprising the local address and the logical name of the apparatus.

In general there is provided a second apparatus, such as for example device 110 or a control apparatus for inclusion in device 110, to control the functioning thereof. The second apparatus may comprise a receiver configured to receive information from a server, the information comprising at least one active content element. Where the second apparatus is a control apparatus such as a chipset or processor, the receiver may comprise an input pin and port comprised in the control apparatus, enabled to receive information internally in device 110 when the control apparatus is installed in device 110. The second apparatus may comprise at least one processing core configured to execute the at least one active content element, wherein each active content element is configured to, when executed, cause the second apparatus to transmit a probe message to a first apparatus. The second apparatus may further comprise a transmitter configured to, responsive to receipt of a response to the probe message, cause a connection request to be transmitted to the first apparatus. Where the second apparatus is a control apparatus, the transmitter may comprise an output pin and port comprised in the control apparatus, enabled to cause a transmitter of device 110 to transmit messages toward the server by signaling from the pin to the transmitter of device

110 internally in device 110. The connection request, probe message and probe response may be conveyed using a local addressing scheme valid in a local network where the second apparatus is disposed.

In some embodiments, the connection request message comprises a local address of the first apparatus as an address of intended recipient, meaning in the to-address field of the connection request message. The connection request message may be routed entirely internally in the local network where the second apparatus finds itself.

In some embodiments, the information comprises a web page, for example a web page formatted according to the hypertext transfer protocol, HTTP. In some embodiments, the at least one active content element comprises at least one hidden subframe, iframe. In some embodiments, the at least one active content element comprises at least one tag other than an iframe allowing cross-domain content loading.

In some embodiments, the server is disposed in another domain than the local domain of the second apparatus. In other words, the second apparatus and the server may be unable to communicate with each other directly using the same addressing since addressing valid in the domain, or network, of the second apparatus is not valid in the domain of the server, and addressing valid in the domain of the server is not valid in the domain of the second apparatus.

In general there is provided a third apparatus, such as for example server 190. comprising a receiver configured to receive a first message from a first apparatus located in a different domain as the third apparatus, the first message comprising a logical name of the first apparatus and a first global address. The receiver is further configured to receive a second message from a second apparatus, the second message comprising a second global address. The third apparatus further comprises at least one processing core configured to determine whether the first and second global addresses are the same address, or where the first and second global addresses are IPv6 addresses, whether they belong to the same network, and responsive to the first and second global addresses being the same address, or in the case of IPv6 the first and second global addresses belonging to the same network, cause transmission of information comprising an active content element to the second apparatus. Determining whether IPv6 addresses belong to the same network may comprise determining whether they share a common prefix, or more generally whether they share a predetermined section of address. The first message may be a registration message. The second message may be a request for information on devices in a same network as the second apparatus.

In some embodiments, the at least one processing core is configured to cause the third apparatus to participate in establishing a notification channel with the first apparatus, and to transmit a notification to the first apparatus via the notification channel in connection with the transmission of the information to the second apparatus. Transmitting the notification in connection with transmission of the information may comprise, for example, transmitting the notification shortly prior to transmissions of the information, at the same time or immediately or shortly after transmission of the information. The third apparatus may be configured to participate in maintaining the notification channel, for example by transmitting and/or receiving keepalive messages to prevent the notification channel from timing out.

Figure 3:
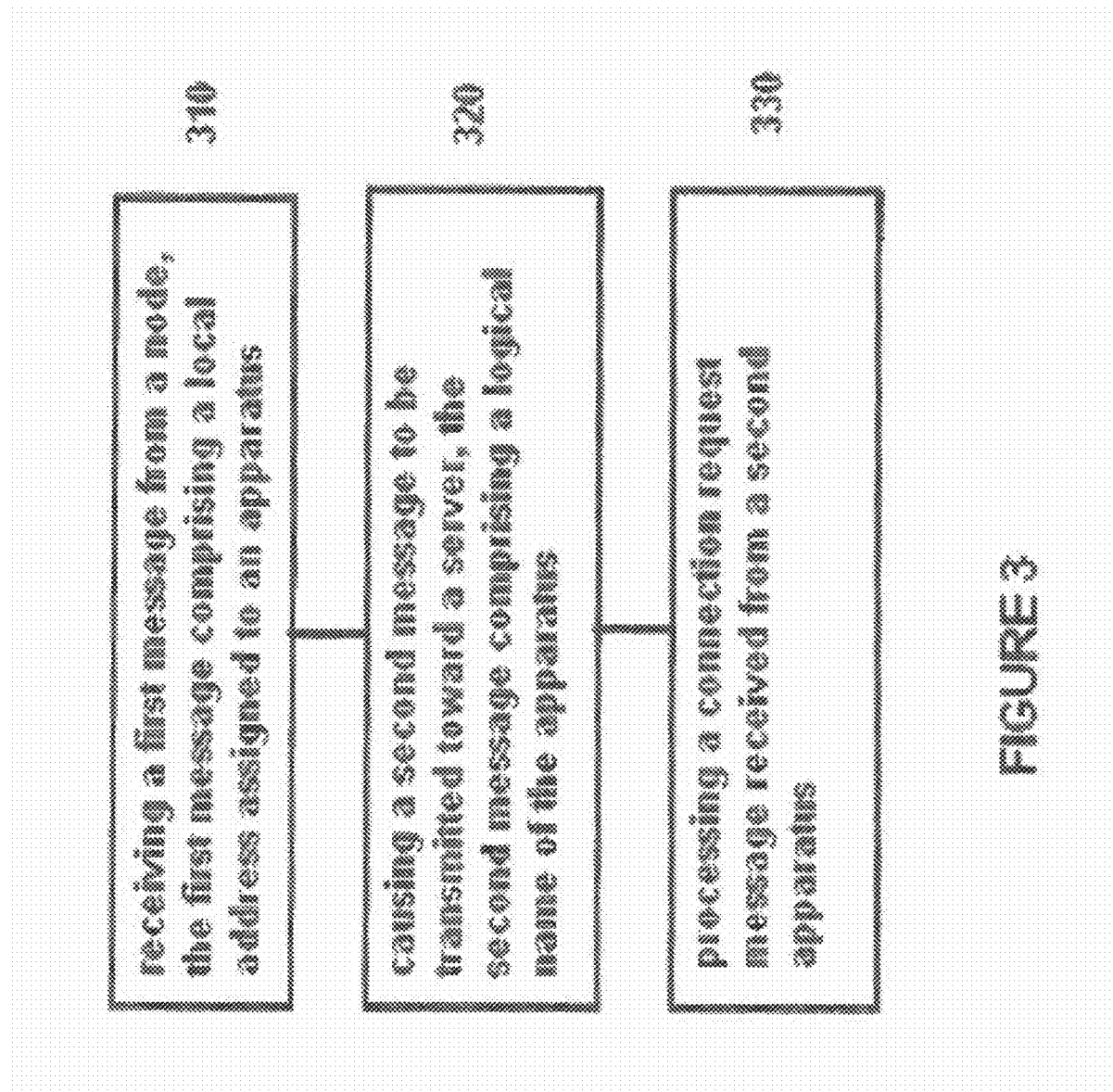
FIG. 3 is a flowgraph of a first method according to at least some embodiments of the invention.

FIG. 3 is a flowgraph of a first method according to at least some embodiments of the invention. The phases illustrated in FIG. 3 may be performed by device 120, for example. In phase 310, a first message is received from a node, the message comprising a local address assigned to an apparatus performing the method of FIG. 3. The node may comprise a network address translation entity, NAT, an access point or a gateway, for example. The first message may be received as a reply to an earlier request for a local address transmitted from the apparatus performing the method of FIG. 3. In phase 320, a second message is caused to be transmitted toward a server. The second message may comprise a logical name of the apparatus performing the method of FIG. 3, and optionally the local address received in phase 310. The second message may be a registration request. The server may be disposed in a different network than the apparatus performing the method of FIG. 3. In some embodiments, phase 320 includes obtaining an external address of the apparatus performing the method of FIG. 3 and including it in the registration request. In phase 330, a connection request is processed, wherein the connection request is received from a second apparatus. In at least some embodiments, the second apparatus is in the same local network as the apparatus performing the method of FIG. 3.

Figure 4:
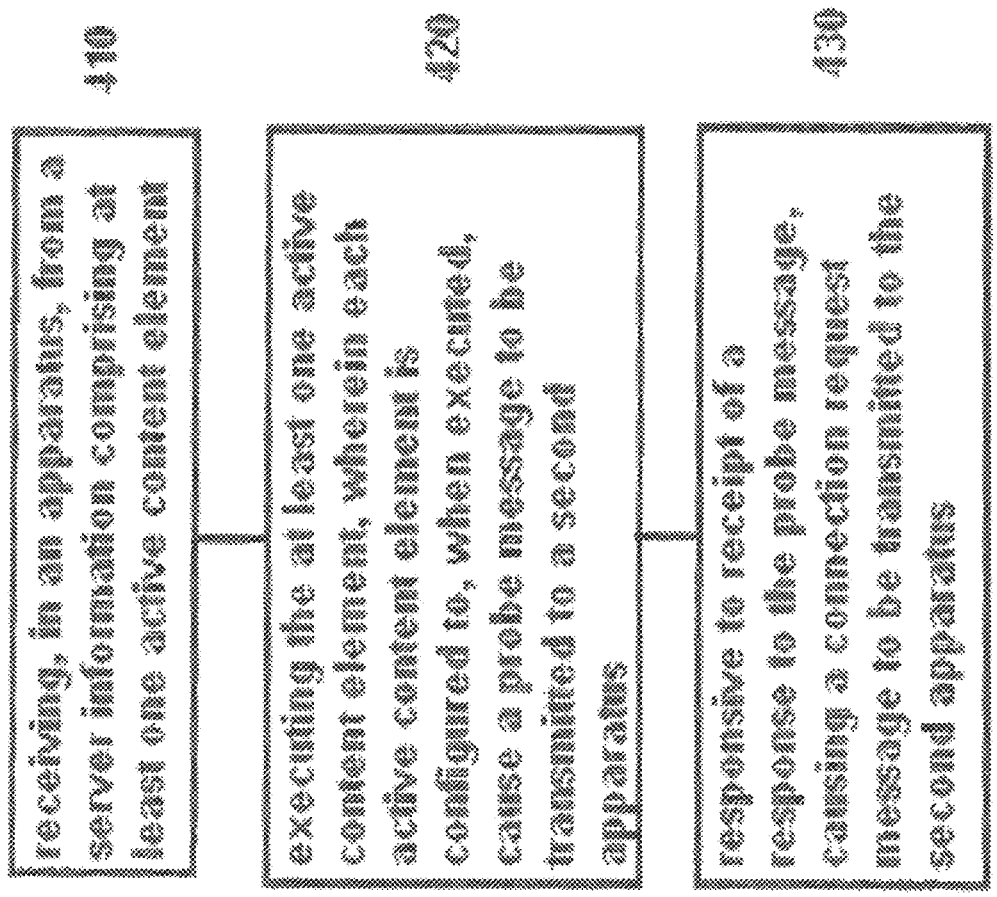
FIG. 4 is a flowgraph of a second method according to at least some embodiments of the invention.

FIG. 4 is a flowgraph of a second method according to at least some embodiments of the invention. The phases illustrated in FIG. 4 may be performed by device 110, for example. In phase 410, information is received in an apparatus, the information being received from a server and the information comprising at least one active content element. The information may be received as a response to a request for such information in order to discover devices in a local network of the apparatus performing the method of FIG. 4. In phase 420, at least one of the at least one active content elements is executed. When executed, an active content element causes the apparatus performing the method of FIG. 4 to transmit a probe message to a second apparatus such as, for example, device 120. In phase 430, responsive to receipt of a response to a probe message sent in phase 420, a connection request message is caused to be transmitted to the second apparatus having sent the response. The connection request message may be transmitted using local addressing, as the second apparatus may be considered, following receipt of the response to the probe message, to be confirmed to be in the same local network as the apparatus performing the method of FIG. 4.

Figure 5:
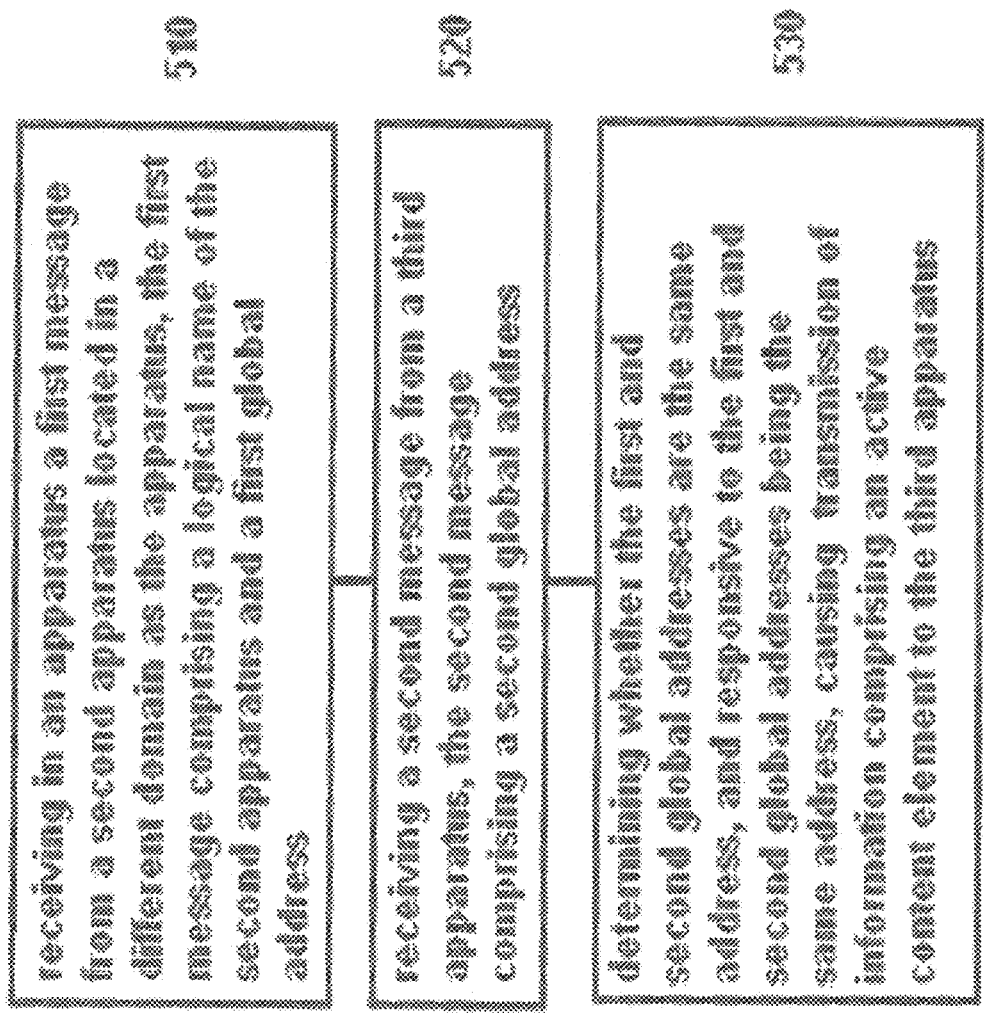
FIG. 5 is a flowgraph of a third method according to at least some embodiments of the invention.

FIG. 5 is a flowgraph of a third method according to at least some embodiments of the invention. The phases illustrated in FIG. 5 may be performed by server 190, for example. In phase 510, a first message is received from a second apparatus such as device 110, for example, located in a different domain as the apparatus performing the method of FIG. 5. The first message may comprise a logical name of the second apparatus and, optionally, a local address of the second apparatus. The first message comprises a first global address. In phase 520, a second message is received from a third apparatus, the second message comprising a second global address. In phase 530, it is determined whether the first and second global addresses are the same address, or where the first and second global addresses are IPv6 addresses, whether they belong to the same network. Responsive to the addresses being the same address, or in case of IPv6 belonging to the same network, information comprising at least one active content element is caused to be transmitted to the third apparatus. The apparatus performing the method of FIG. 5 may guess that the second and third apparatuses are in the same local network when the first and second global addresses are the same, or in case of IPv6 when they are in the same network, and will send to the third apparatus information concerning the second apparatus, wherein the information may comprise an active content element concerning the second apparatus. The information concerning the second apparatus may comprise a logical name of the second apparatus and, optionally, a local address of the second apparatus where the second apparatus has provided it to the apparatus performing the method of FIG. 5 in phase 510.

Figure 6:
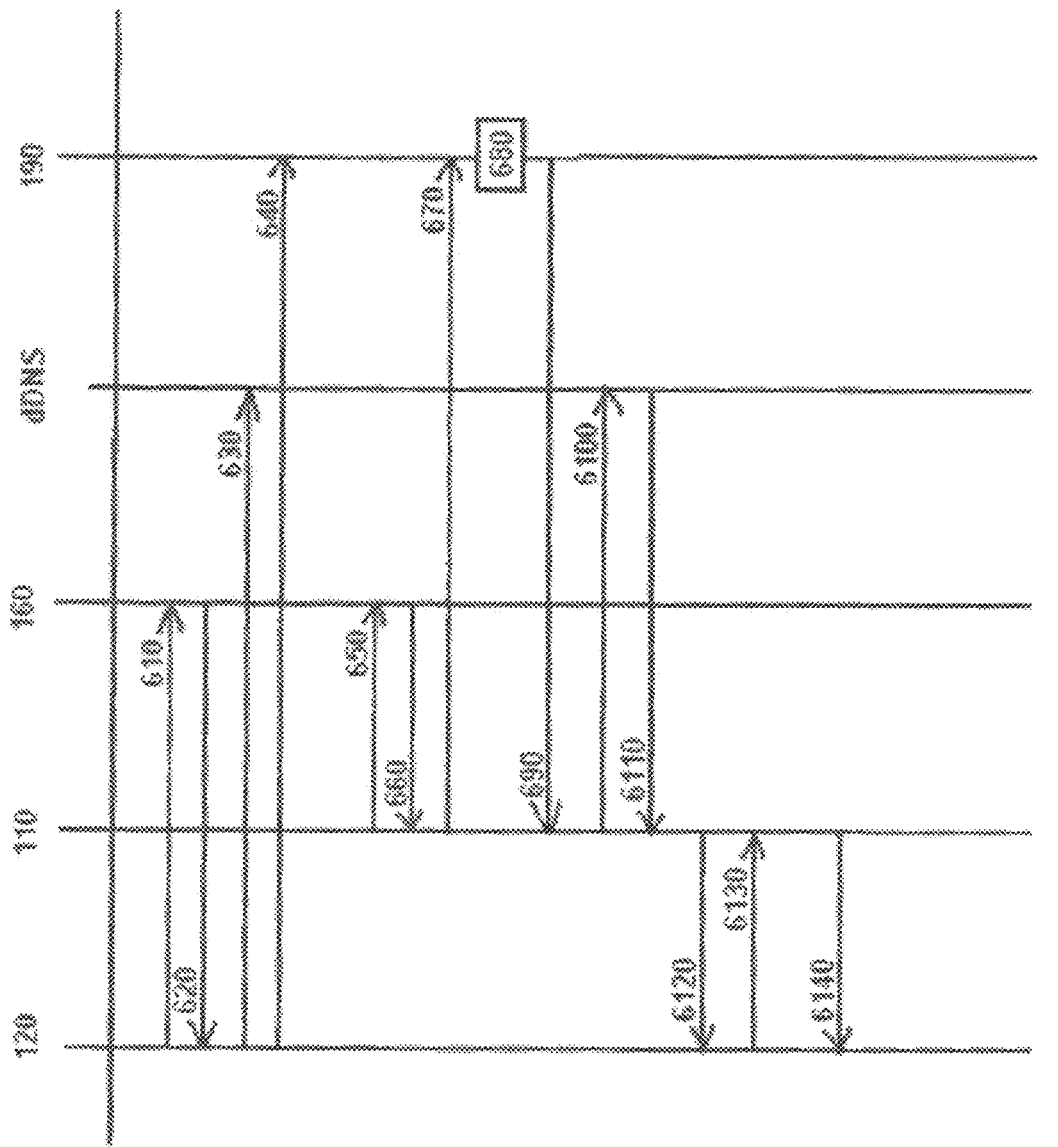
FIG. 6 is a signaling diagram illustrating a first example embodiment of the invention.

FIG. 6 is a signaling diagram illustrating a first example embodiment of the invention. The vertical axes correspond, from left to right, to device 120, device 110, gateway 160, a dynamic DNS, and server 190.

In phase 610, device 120 connects to gateway 160 by transmitting a message to gateway 160. The message of phase 610 may comprise a request to assign an address to device 120. In response, gateway 120 in phase 620 assigns a local address to device 120 by transmitting a message to device 120, the message comprising the local address. In phase 630, device 120 may register the local address in a dDNS together with a logical name of device 120. In phase 640 device 120 registers its logical name in server 190 by transmitting a registration message to server 190, the registration message comprising the logical name of device 120 and, optionally, the local address. The registration message may traverse gateway 160 or another gateway en route to server 190 such that latest when it arrives at server 190, it comprises an external address of device 120.

In phase 650, device 110 connects to gateway 160 and responsively, in phase 660, device 120 receives a local address from gateway 160, the local address being assigned by gateway 160 to device 120. In phase 670 device 110 transmits to server 190 a request for information concerning further devices in the same local network as device 110. Responsively, in phase 680, server 190 determines from information stored in a database of server 190 information that is associated with device 110 via an external address, by comparing external addresses comprised in message 670, 640 and optionally also other messages received in server 190, which are not illustrated in FIG. 6. In phase 690, server 190 transmits to device 110 information concerning at least device 120, having determined in phase 680 that messages 640 and 670 comprised a same external address, for example in a from-address field. The message of phase 690 may comprise an active content element associated with device 120, or at least the message of phase 690 comprises the logical name of device 120. The active content element may comprise or have access to the logical name of device 120.

In phase 6100, device 110 queries dDNS for a local address of device 120 using the logical name of device 120 received in the message of phase 690. In phase 6110 device 110 receives the local address of device 120 from the dDNS. In phase 6120 device 110 transmits a probe message to device 120 using the local address of device 120, and in phase 6130 device 120 responsively acknowledges the probe message by transmitting a message to device 110. Device 110 may be configured to perform phases 6100 and 6120, and participate in phases 6110 and 6130, under direction of an active content element received in phase 690. In phase 6140, having received the probe acknowledgement of phase 6130, device 110 transmits a connection request message to device 110.

Figure 7:
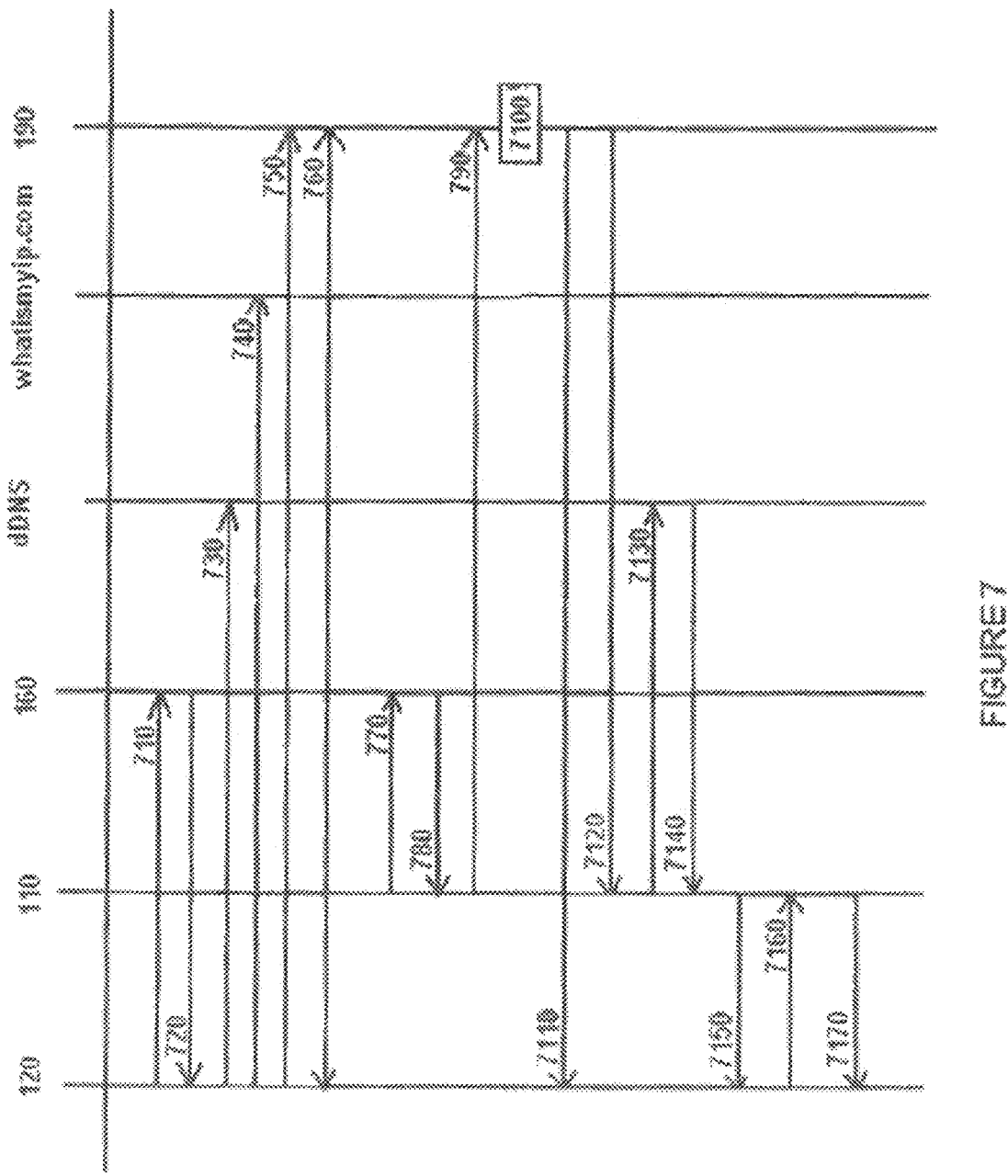
FIG. 7 is a signaling diagram illustrating a second example embodiment of the invention.

FIG. 7 is a signaling diagram illustrating a second example embodiment of the invention. The vertical axes are similar to those in FIG. 6, except that in FIG. 7 an external address provision function is included, which is labeled "whatismyip.com".

In phases 710, 720 and 730 device 120 joins a local network as in phases 610, 620 and 630 of FIG. 6, respectively. In phase 740 device 120 queries the external address provision function for the external address of device 120, the address provision function responsively providing the external address in phase 740 by return message, which is not illustrated in FIG. 7. In phase 750 device 120 transmits a registration request to server 190, phase 750 is essentially similar to phase 640 of FIG. 6. In phase 760 a notification channel is established between device 120 and server 190. Although illustrated as succeeding phase 750, phase 760 may precede or be included in phase 750.

Phases 770, 780, 790, 7100, 7120, 7130, 7140, 7160 and 7170 are essentially similar to phases 650, 660, 670, 680, 690, 6100, 6110, 6120 and 6140, respectively. In phase 7110, server 190 notifies device 110 via the notification channel that device 110 may be probed. Although illustrated as preceding phase 7120, phase 7110 may be included in or succeed phase 7120 by a short time. In phase 7150, device 110 may be configured to, responsive to receiving the probe message of this phase, adjust a firewall setting of device 110 to allow traffic from device 110.

Figure 2:
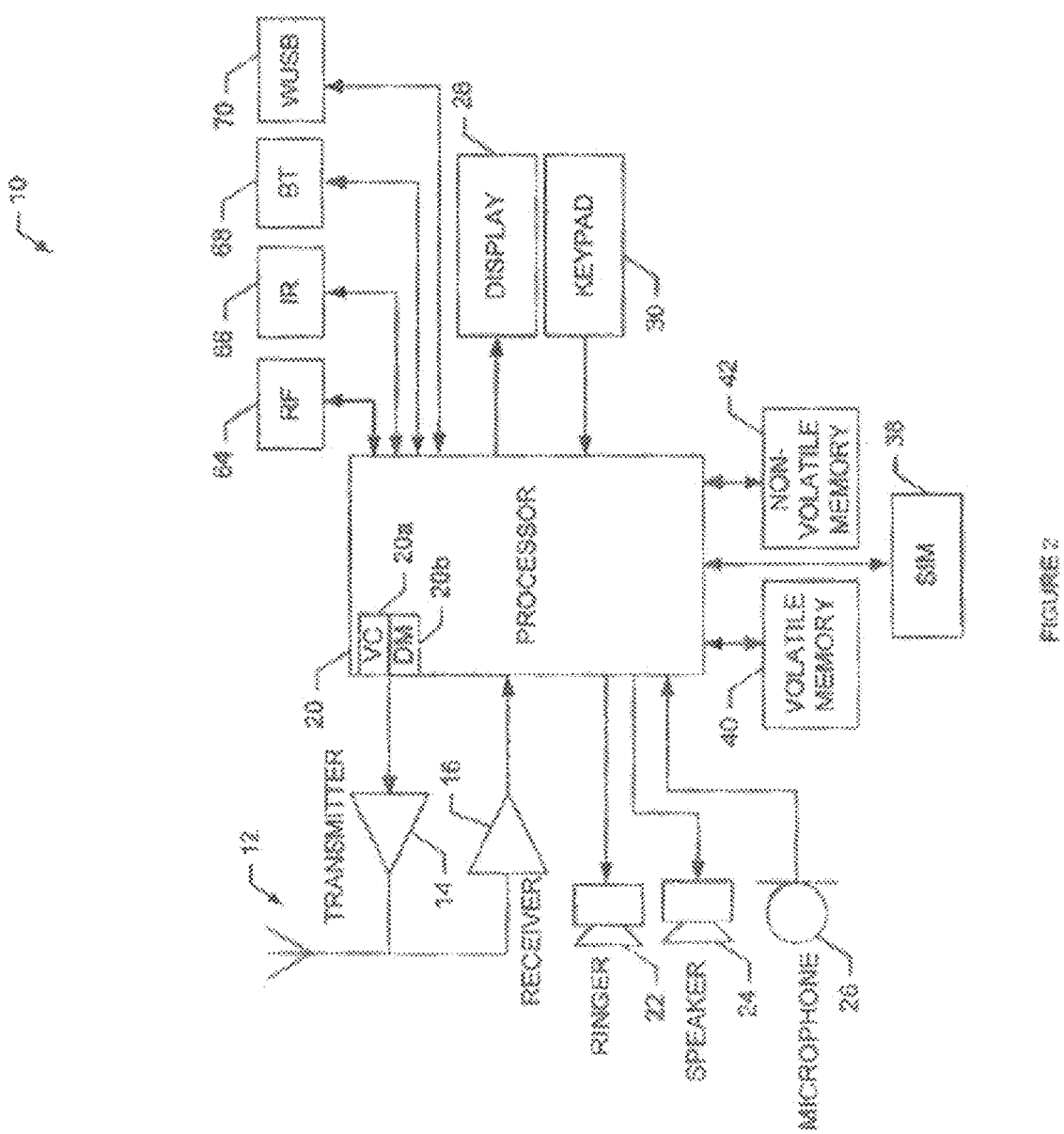
FIG. 2 illustrates a block diagram of an apparatus 10 in accordance with an example embodiment of the invention.

FIG. 2 illustrates a block diagram of device such as, for example, device 110 or device 120. In the example of FIG. 2 the device is illustrated as a mobile terminal 10. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™ BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that device discovery in a local network is simplified. Another technical effect of one or more of the example embodiments disclosed herein is that device discovery in a local network can be accomplished without broadcasting. Another technical effect of one or more of the example embodiments disclosed herein is that security of device discovery and security of devices is improved.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a receiver configured to receive a first message from a second apparatus located in a different domain than the apparatus, the first message comprising a logical name of the second apparatus and a first global address, the first message being a registration message;
the receiver being further configured to receive a second message from a third apparatus, the second message comprising a second global address as an address of the third apparatus, the second message being a request message, and
at least one processing core configured to determine whether the first and second global addresses are the same address, or where the first and second global addresses are IPv6 addresses, whether they belong to the same network, and responsive to the first and second global addresses being the same address, or in the case of IPv6 belonging to the same network, cause transmission of information comprising at least one of a logical name and a local address of the second apparatus, comprised in an active content element relating to the second apparatus, to the third apparatus, the first and second global addresses being gateway addresses.

2. The apparatus according to claim 1, wherein the at least one processing core is configured to cause the apparatus to participate in establishing a notification channel with the second apparatus, and to transmit a notification to the second apparatus via the notification channel in connection with the transmission of the information to the third apparatus.

3. The apparatus according to claim 2, wherein the notification is transmitted after receipt of the second message and before transmission of the information to the third apparatus.

4. The apparatus according to claim 1, wherein the information comprises a web page.

5. The apparatus according to claim 1, wherein the active content element comprises at least one hidden subframe.

6. The apparatus according to claim 1, wherein the active content element comprises at least one tag allowing cross-domain content loading.

7. A method, comprising:
receiving in an apparatus a first message from a second apparatus located in a different domain as the apparatus, the first message comprising a logical name of the second apparatus and a first global address, the first message being a registration message;
receiving a second message from a third apparatus, the second message comprising a second global address as an address of the third apparatus, the second message being a request message, and
determining whether the first and second global addresses are the same address, or where the first and second global addresses are IPv6 addresses, whether they belong to the same network, and responsive to the first and second global addresses being the same address, or in the case of IPv6 belonging to the same network, causing transmission of information comprising at least one of a logical name and a local address of the second apparatus, comprised in an active content element relating to the second apparatus, to the third apparatus, the first and second global addresses being gateway addresses.

8. The method according to claim 7, further comprising causing the apparatus to participate in establishing a notification channel with the second apparatus, and to transmit a notification to the second apparatus via the notification channel in connection with the transmission of the information to the third apparatus.

9. The method according to claim 8, wherein the notification is transmitted after receipt of the second message and before transmission of the information to the third apparatus.

10. The method according to claim 7, wherein the information comprises a web page.

11. The method according to claim 7, wherein the active content element comprises at least one hidden subframe.

12. The method according to claim 7, wherein the active content element comprises at least one tag allowing cross-domain content loading.

13. A non-transitory computer readable medium having stored thereon a set of computer readable instructions that, when executed by at least one processor, cause an apparatus to at least:

receive in an apparatus a first message from a second apparatus located in a different domain as the apparatus, the first message comprising a logical name of the second apparatus and a first global address, the first message being a registration message;

receive a second message from a third apparatus, the second message comprising a second global address as an address of the third apparatus, the second message being a request message, and determine whether the first and second global addresses are the same address, or where the first and second global addresses are IPv6 addresses, whether they belong to the same network, and responsive to the first and second global addresses being the same address, or in the case of IPv6 belonging to the same network, cause transmission of information comprising at least one of a logical name and a local address of the second apparatus, comprised in an active content element relating to the second apparatus, to the third apparatus, the first and second global addresses being gateway addresses.

* * * * *